United States Patent
De Calmes et al.

(10) Patent No.: US 8,546,471 B2
(45) Date of Patent: Oct. 1, 2013

(54) WATERBORNE ADHESIVE WITH IMPROVED WET ADHESION

(75) Inventors: Nicolas De Calmes, Dainville (FR); Victor Dario Buj Vilalata, Neuss (DE); Ralf Gossen, Duisburg (DE); Hermann-Josef Plum, Juelich (DE); Ethel Abrahams-Meyer, Viersen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/366,921

(22) Filed: Feb. 6, 2012

(65) Prior Publication Data

US 2012/0208920 A1 Aug. 16, 2012

Related U.S. Application Data

(63) Continuation of application No. PCT/EP2010/061239, filed on Aug. 3, 2010.

(30) Foreign Application Priority Data

Aug. 14, 2009 (EP) .................................... 09167903

(51) Int. Cl.
*C08L 89/00* (2006.01)

(52) U.S. Cl.
USPC ................. 524/17; 523/177; 524/35; 524/47; 524/48

(58) Field of Classification Search
USPC .......................... 523/177; 524/17, 35, 47, 48
See application file for complete search history.

(56) References Cited

U.S. PATENT DOCUMENTS

| 3,891,584 A | 6/1975 | Ray-Chaudhuri et al. |
| 5,455,066 A | 10/1995 | Broich et al. |
| 6,238,509 B1 | 5/2001 | Herlfterkamp et al. |
| 2006/0004150 A1* | 1/2006 | Baumgart et al. ............. 525/419 |

FOREIGN PATENT DOCUMENTS

EP 1025179 B1 10/2006

OTHER PUBLICATIONS

Buchholz, Fredric et al. "Modern Superabsorbent Polymer Technology," John Wiley & Sons, Inc., 1998.
Written Opinion, dated Feb. 2, 2012, International Application PCT/EP2010/061239.

* cited by examiner

*Primary Examiner* — Edward Cain
(74) *Attorney, Agent, or Firm* — Sun Hee Lehmann

(57) ABSTRACT

A Waterborne adhesive comprising 1 to 50 weight-% of a (meth)acrylate copolymer manufactured by polymerization of at least one ester of methacrylic acid, acrylic acid, crotonic acid and/or itaconic acid with aliphatic alcohols, substituted aliphatic alcohols, aromatic alcohols, polyether glycols, and other copolymerizable monomers, having an acid number from 0 to 150 mgKOH/g, 0 to 40 wt-% of natural polymers 0.5 to 30 wt-% of urea, 0.1 to 20 wt-% of additives, characterized in that the adhesive contains 0.05 to 20 weight-% of a super absorbent polymer.

9 Claims, No Drawings

WATERBORNE ADHESIVE WITH IMPROVED WET ADHESION

The present invention relates to waterborne adhesives which shall be used as labeling adhesive for containers.

Waterborne adhesives are well-known in the art as adhesives for a wet-labeling process. Such adhesives will be applied on one side of a label and thereafter the label will be glued to the container. For process reasons the bottles are already filled with its content when the label is applied. In many cases the content is cooled. As consequence the bottle will have a cooled outside surface below the temperature of the environment. As the surface of the bottle is cooled, water vapor from the surrounding environment will condense on the surface. On such surface the labels shall be bonded in a high speed labeling process. A problem which arises in practice is a bad adhesion on this wet surface directly after labeling.

Another requirement for useful adhesives includes the possibility to remove the bonded labels from the container in a recycling process. So the dried adhesive shall be soluble in water or alkaline solutions in a short period of time. It is preferred that the adhesive shall remain on the label surface and not on the bottle.

U.S. Pat. No. 3,891,584 discloses a water dispersible hot melt adhesive, comprising 75 to 95 parts of a grafted copolymer, containing vinyl monomers and a water soluble polyoxyalkylene oxide polymer and a tackifying resin. This adhesive is applied as hot melt adhesive in the process for labeling bottles. Hot melt adhesives are applied in a molten state so they require heating equipment which is cost intensive.

The WO 97/00298 discloses an adhesive system for gluing plastic labels onto plastic bodies. Such adhesive system comprises a pick up glue containing one water soluble polymer based on casein, starch, dextrine, glucose or polyvinyl alcohol and small amounts of anti foaming agent and preservatives.

U.S. Pat. No. 5,455,066 disclose a water containing adhesive for labeling bottles. This adhesive is based on casein, a water-soluble extender and natural synthetic resin acids, resin alcohols or resin esters. As this adhesive contains large amounts casein, the problem of bad odor can be observed during the recycling process. Beside from this natural adhesive polymers like casein are fluctuating in its properties.

EP 1025179 discloses an aqueous adhesive prepared from 25 to 50% of an acrylic polymer, comprising hydrophobic monomers, hydrophilic monomers, polymerizable carboxylic acid and other copolymerisable monomers. Such adhesive may content additionally starches, dextrines, polyvinyl alcohol or polyvinyl acetate, additionally resins or other additives.

The adhesives of the prior art show often the effect, that the bonding of labels to a surface which is covered with a wet film layer is not sufficient. This means that often the containers are filled with its contents and cooled down and a wet surface will occur. This humidity shall not have the effect that the label may gliss or slide on the surface in the further processing. The label shall be put on place and remain on its position. This effect is known as condense water resistance (CWR). This effect can be reduced by warming the surface, for example with hot melt adhesives, but this application technology is different as the adhesive is applied in a molten state. The adhesive has a certain capacity of warming up the surface of the bottle and reduce the problem of condense water. But the application of hot melt adhesives is more complex then waterborne adhesives.

It is the object of the invention to provide a waterborne adhesive based on acrylic polymers, which may be applied in a high speed application process as labeling adhesive to containers which have a humid surface of condensed water. The initial bonds strength on the surface shall be high. No failure due to the wet surface shall occur, the label shall remain in place and a good adhesion shall be seen. Additionally after the use cycle of the container the label shall be removed from the surface by the known methods of washing the adhesive with water or an alkaline solution.

The object is achieved by a waterborne adhesive comprising 1 to 50 weight-% of a (meth)acrylate copolymer, the copolymer having an acid number from 0 to 150 mg KOH/g, 0 to 40 wt-% of natural polymers, 0.5 to 30 wt-% of urea, 0.1 to 20 wt-% of additives characterized in that the adhesive contains 0.05 to 20 wt-% of a water swellable polymer.

One component of the adhesive is a (meth)acrylate copolymer as backbone. This copolymer is usually provided as dispersion in water. Such (meth)acrylic copolymers shall consist mainly of the known unsaturated radically polymerizable monomers based on (meth)acrylic acid and its esters and other monomers which are copolymerisable with such (meth)acrylate monomers. The copolymer may contain functional groups enhancing the solubility, but it shall not contain crosslinking groups or separate crosslinkers. So the copolymer of the adhesive in the dispersed state and after application is not crosslinked. The copolymers used in accordance with the present invention are preferably formed by copolymerization of at least one monomer of hydrophobic type with at least one monomer of a hydrophilic type, one carboxylic group containing monomer and optionally other monomers. Especially esters of (meth)acrylic acid, crotonic acid and/or itaconic acid with polyether glycols, aliphatic, cycloaliphatic or aromatic alcohols and other copolymerizsable monomer are useful as monomers.

Monomers of the hydrophobic type are such monomers which form a discrete, disperse organic liquid phase in water as the continuous phase under the emulsion copolymerization conditions according to the invention. Suitable monomers of this type are esters of unsaturated polymerizable carboxylic acids, more particularly alkylester of acrylic or methacrylic acid; aromatic vinyl compounds, such as styrene, α-methyl styrene and vinyl toluene; esters of vinyl alcohol, more particularly fatty acid vinyl ester; N-alkylamides of unsaturated polymerizable carboxylic acids, more particularly (meth)acrylic acid; and other copolymerizable olefinic monomers, for example (meth)acrylonitrile, vinyl chloride, of vinylidene chloride type and olefins, such as ethylene, butadiene, isoprene and comparable olefins with no other functionality. The esters of acrylic acid and methacrylic acid, preferably the corresponding esters with lower monohydric alcohols, such as $C_1$ to $C_{12}$ alcohols; in particular the corresponding methyl, ethyl, propyl, butyl, 2-ethylhexyl and/or decyl esters are used as monomers. Aromatic vinyl compounds of the styrene type are also suitable. Such monomers enhance the adhesion to unpolar substrates.

The second group of monomers is of the hydrophilic type. Suitable monomers are copolymerizable monomers which contain polar substituents, for example acrylamide, methacrylamide; hydroxyalkyl(meth)acrylates like hydroxyethyl acrylate or methacrylate, hydroxypropyl (meth)acrylate, hydroxy-butyl (meth)acrylate, hydroxyethyl acrylamide; N-vinyl lactames, like N-vinyl pyrrolidone; ethylene glycol esters of (meth)acrylic acid and partial esters of glycerol and (meth)acrylic acid. Such monomers may be used alone or as mixture. Such monomers shall enhance the polarity of the polymer and improve the water sensitivity.

Whereas monomers of hydrophilic and hydrophobic type are always used in the production of such (meth)acrylic copolymer, the use of the monomers which contain acidic groups is optional. Carboxyfunctional comonomers are particularly useful in this regard. Examples are maleic acid, fumaric acid or semi-esters, acrylic acid, methacrylic acid, itaconic acid and/or crotonic acid, preferably monocarboxylic acids. Other monomers of this class are unsaturated monomers containing sulfonic acid groups. Such acid group containing monomers can form ionic groups in an aqueous phase which will improve the solubility of the polymer in water.

Typically the molar ratio of hydrophobic monomers to the monomers containing hydrophilic groups is selected so that at least 30 mol-% of hydrophobic monomers and at least 5 mol-% of monomers containing hydrophilic groups are used. Optionally, up to 30 mol-% of the hydrophilic monomers can be replaced by monomers containing acid groups. Preferably the copolymer may contain 40 to 80% hydrophobic monomers, 10 to 50% hydrophilic monomers and 2 to 20% ionic group containing monomers, the sum shall constitute 100%. The copolymer shall have a molecular weight (number average molecular weight, $M_N$, obtainable by GPC) between 10.000 to 500.000 g/mol, preferably less than 300.000 g/mol, the acid number is 0 or up to 150 mg KOH/g (EN ISO 2114). It is particularly preferred to use copolymers having an acid number from 20 to 150 mg KOH/g, or between 40 to 130. It is preferred to select monomers so that the glass transition temperature $T_g$ (measured by DSC, DIN ISO 11357) of the (meth)acrylic copolymer is less than 0° C., preferably less than −10° C.

For the preparation of the adhesive, the (meth)acrylic copolymers are preferably used in the form of aqueous solution, emulsion or dispersion. The dispersion may contain at least one emulsifying agent in an amount which will render the copolymer water dispersible or it shall be soluble or dispersible in water by neutralisation of at least part of the acidic groups, e.g. the carboxylic groups. Any standard oil-in-water emulsifiers or emulsifier systems (nonionic, anionic or cationic surfactants) may be used. The solid content of the dispersion is between 20 to 70% preferable between 35 to 55% (DIN 53 189, 105° C.). Such copolymers and dispersions are commercially available. The copolymer shall be used in an amount of 1 to 50% by weight of the solid adhesive composition.

As additional component the adhesive composition may contain components to modify rheological properties of the adhesive. As additional component natural polymers can be incorporated. Such polymers can be selected from starch, dextrin, cellulose or proteins. The starch used in the adhesive composition is selected from the non-jellified, commercially available starches, for example rice, wheat, corn, potato, tapioca or pea starch. The starch may be used in its natural form, or it may be physically, chemically or enzymatically modified. As derivative such starch products can be used which are obtained by reaction of native starch as degraded, oxidized or grafted starch, starch ethers and/or starch esters. Preferably non-ionic starch ethers are used, e.g. hydroxypropyl or hydroxyethyl starch or carboxy-methyl starch. Alternatively as additional component dextrin can be used. Dextrins are manufactured as degradation products from starch, e.g. enzymatically degraded starch like maltodextrin. Also it is possible to add protein polymers for example casein as further component.

The natural polymers can be used as single substance or as mixture. Preferably starch derivatives and/or casein can be used. Suitable commercial products are well known in the art. The amount of this component is selected from 0 up to 40 wt-%, preferably between 2 to 30 wt-%.

Additionally the adhesive contains a component for regulating the viscosity. Such component is selected from water-soluble low-molecular weight liquefiers, like urea, thiourea, guanidine, dicyandiamide and/or derivatives. The molecular weight of such substances is below 250 g/mol. One substance or a mixture can be used. The amount used may vary from 0.5 to 30 wt-%. Such substances and the effects are known to a man skilled in the art.

The composition according to the invention shall contain a water swellable polymer. Such polymers are known in the art, for example as super absorbent polymers (SAP), as hydrogels or as flocculation polymers. These polymers have the capacity of including high amounts of water in its polymer chains without dissolving totally in water. For the following invention all such in water swellable polymers either forming a chemical or ionic network or having a high molecular weight with dipole binding shall be included in the term SAP. This is achieved by different types of polymers. In each case the polymer shall include high amounts of ionic or polar groups. The polymers can form a network for example the polymer chains are chemically crosslinked at least they are partially crosslinked. Another type of polymer contains a large extend of ionic bonds or hydrogen bonds. This different polarity may form a network by ionic bonding. Another type of polymers is high molecular weight polymers of more then 500000 g/mol, which may form a linear or branched structure. Such polymer chains can be entangled or they form a high dipole interaction and will show a high capacity of swelling with water. SAP polymers are disclosed in F. L. Buchholtz, A. T. Graham, "Modern super absorbent polymer Technology", Wiley-VCH, New York, 1998.

Super absorbent polymers are polymers in solid form which have a high absorption for water, which shall be retained also under pressure. Such SAP is insoluble in water but they are swellable. The polymers can be crosslinked or partially crosslinked so that they do not dissolve in water. The crosslinking can be performed in the core of the particles or at the outer shell. Such super absorbent polymers are known and commercially available for use as water retention agent, viscosity regulation or as flocculation aid. In this invention all super absorbent polymers can be used which are dispersible in the adhesive.

One preferred type of SAP is polyacrylic acids. It shall include the known homo- and co-polymers of acrylic acid or methacrylic acid ((meth)acrylic acid), with other comonomers, e.g. (meth)acrylonitrile, (meth)acrylamide, vinyl acetate, vinyl pyrrolidone, maleic acid, maleic anhydride, itaconic acid, itaconic anhydride, vinyl sulfonic acid or hydroxyalkyl esters of such acids. 0 to 95 wt. % of the acid groups of this polymer shall be neutralised with alkali or ammonium groups and these polymers/copolymers are crosslinked by addition of polyfunctional compounds. Such polymers are known and commercially available.

Another preferred type of SAP is crosslinked starch products. Starch normally is used as derivative, for example as grafted starch. As graft monomers e.g. (meth)acrylate monomers are be used. Principally the same monomers as written above can be polymerized. Preferably the grafted polyacrylic part is at least partly crosslinked. Usually at least 50% of the carboxylic groups are neutralized. Due to the manufacturing process such grafted polymers may contain also polyacrylic acid polymers.

Another preferred type of swellable polymers is polymers based on polyacrylamide or polyacrylonitril. Optionally such polymers contain additionally comonomers with polar groups. As these polymers contain high amounts of polar groups the degree of chemically crosslinking is often lower than the normal SAP or they from a plurality OH-bridges. Another type of polymer is based on mixed polyesterpolyamides. The polymer may contain carboxylamid-, polyethylenglycol-tert. amino-groups, dicarboxylic esters and other polar groups. The polymers are of high molecular weight and contain large amounts of ionic groups. High molecular weight shall mean more than 300.000 g/mol or they are partially crosslinked.

Another preferred type of SAP is swellable polymers based on high molecular weight polyalkylenglycols. Such polymer shall contain preferably polyethylene glycols. They may contain as terminal groups unsaturated esters which can be crosslinked by polymerization. Also polyalkylenglycols are available which are crosslinked with OH-groups by addition and reaction of crosslinkers. Another group of polyethylenglycols have a high molecular weight ($M_N$), for example of more than 300000 g/mol, preferably from 500.000 up to about 10.000.000 g/mol. The polymer chain can be entangled and it shows high dipole interaction so that it has a high capacity to swell and retain water. Commercially available products are available with different molecular weight.

Another type of SAP includes polymerization products of N-methyl-pyrrolidon. Such polymer are of high polarity and swellable in water. To be used according to the invention such polymers shall be at least partially crosslinked.

Another type of SAP is based on crosslinked, partially neutralized copolymers of isobutylene and maleic anhydride. Another type of SAP is based on saponification products of vinyl acetate-acrylic acid copolymers. Also high molecular weight polyvinylic alcohols are suitable as swellable polymer. Polyvinylic alcohols are derivable from vinyl acetate polymers by hydrolysis. For use as swellable polymer they should be crosslinked or have a high molecular weight. Polyvinylalcohols are commercially available in a broad range of molecular weight and other properties. An additional type of swellable polymers useful for this invention is modified natural products. For example xanthane and xanthane gums have a high capacity to incorporate water and to swell.

The SAP suitable for use in the invention is powdered substances. The particle size may reach from 1 to 1000 µm. The particle size is selected so that the particles can be embedded in thin layers of the adhesive. The SAP can be added to the dispersion of the (meth)acrylate copolymer. But it is preferred that the SAP shall be dispersed in water prior to mixing it with the adhesive. Such dispersion is highly viscous or may from a gel, but it can be further dispersed in the adhesive. The SAP powder shall be finely dispersed in the waterborne solution of the adhesive so that the stability of the adhesive is ensured. The amount of the SAP covers a broad range from 0.05 to 20 wt-%, preferably from 0.2 to 10 wt-% of the total composition.

The aqueous adhesive may also comprise other additives or auxiliaries typically used in labeling adhesives, for example tackifiers, surfactansts, biocides, stabilizers, pH agents, dyes, pigments, adhesion promotors, polyols or other known additives. The adhesive may contain such auxiliaries between 0.1 and 25 wt-%, preferably from 0.5 to 15 wt.-%.

As additive the adhesive may comprise a tackifying resin. The resin provides additional tackiness and improves the compatibility of the adhesive components. The resin is preferably selected from hydroabietyl alcohol and its esters, more particularly its esters with aromatic carboxylic acids, such as terephthalic acid and phthalic acid; modified natural resins, such as resin acids from gum rosin, liquid rosin or wood rosin, for example fully saponified gum rosin or alkyl esters of optionally partly hydrogenated pine rosin with low softening points, such as for example methyl, diethylene glycol, glycerol and pentaerythritol esters; resins based on functional hydrocarbon resins; terpene-phenol resins or ketone resins.

Suitable resins are preferably rosins. Also derivatized rosins, for example hydrogenated or disproportionated rosins, are used the objective of derivatization being above all to increase solubility or dispersibility in water. The acid number of such rosin is between 0 to 300 mg KOH/g, preferably between 70 to 220 mg KOH/g. It is used in a quantity of 0 to 20 wt-%.

Another group of auxiliaries include other water-soluble or -dispersible polymers different from the above mentioned type and composition. This includes polymers for controlling the open time, selected from the class of alcohols. This includes water soluble polymers like sugars, mono-, di- or polyalcohols which are suitable as auxiliaries.

Another groups of auxiliaries are adhesion promotors. Examples for such products are monomeric or oligomeric organo-functional silanes which contain additionally hydrolysable groups at the Si-atom. This substances may include 3-Glycidoxy-Propyltrialkoxysilan, 3-Acryloxypropyltrialkoxysilan, 3-Aminopropyltrialkoxysilan, 1-Aminoalkyltrialkoxysilan, α-Methacryloxymethyltrialkoxysilane, Vinyltrialkoxysilane, N-Aminoethyl-3-Aminopropyl-Methyldialkoxysilane, Phenylaminopropyltrialkoxysilane, Aminoalkyltrialkoxydisilane, i-Butylmethoxysilane, N(2-Aminoethyl)-3-aminopropyltrialkoxysilane, Methacryloxymethyl-triethoxysilane, mixtures thereof with alkoxy including preferably $C_1$ to $C_4$ mono-alcohols. The preferred amount used is from 0.05 to 5 wt-%, especially from 0.1 to 2 wt-%.

In addition, the adhesives according to the invention may contain other additives for the improvement of special properties, e.g. the storage life with known preservatives, like benzoates, fluorides; processing properties, for example antifoam agents or wetting agents, like stearates, silicone oil and addition products of ethylene oxide or propylene oxide with fatty alcohols; pH regulating substances; and surfactants.

The adhesive according to the invention can be manufactured by known methods. For example a dispersion of the (meth)acrylic copolymer can be prepared by emulsion polymerisation. To this water borne dispersion the other components, e.g. starch, dextrin or other polymers can be added and dispersed. Further additives can be mixed including additives to adjust the pH. Typically the pH shall be adjusted from pH 6.5 to 9.5 preferably from 7.0 to 9.0. A different type of adhesive shall be adjusted to a range from 9 to 12 which improve the adhesion to specific substrates for example plastic surfaces. If required urea and other components for adjusting the viscosity are added and mixed. The SAP can be added and finely dispersed in the dispersion but it is preferable to disperse the SAP in water prior to the addition to the adhesive composition.

The waterborne adhesive is stable and can be stored for longer time. The solid content (DIN 53189) can reach from 20 to 80° A), preferably from 30 to 65%. Preferably the adhesive shall be free from organic solvents.

A preferred composition of an adhesive shall consist of 5 to 35 wt-% of the (meth)acrylate copolymer, 2 to 20 wt-% of starch, dextrin and/or proteins, 0.5 to 20 wt-% of urea, 0.5 to 15 wt-% of additives and auxiliaries and 0.2 to 10 wt-% of at least one SAP. The amount of water can reach from 35 to 80 wt-% of the total composition, preferably from 50 to 75 wt-%, the sum of all components shall yield 100%.

The viscosity of the adhesive shall be adjusted between 10000 to 250000 mPas at application temperature, preferably 30000 to 150000 mPas (25° C., Brookfield, EN ISO 2555). A different form of the adhesives exhibit a viscosity range from 10000 to 100000 mPas which is preferable used for plastic surfaces.

The application process of an adhesive according to the invention is known. It is applied on one side of a label which immediately thereafter is attached to the container which shall have humid surface. The devices for such process are known to a person skilled in the art. The waterborne adhesive according to the invention is applied in an amount of 5 to 80 g/m² preferably from 5 to 50 g/m². The labels include the known materials; especially paper labels can be used with such adhesive. The substrates are containers used for the packaging of food and drinks, as bottles, cans, drums and other containers. The material of the substrate is selected from glass, metals, polymers, multi-layer packaging material and the like. Preferably bottles and cans for beverages are used as substrates. After application of the label the containers are further processed and finally allowed to dry.

The effect of an adhesive according to the invention is the improved adhesion to wet or humid surfaces. Labels glued with a standard waterborne acrylic adhesive bonded to a humid surface will slide and slip at least partly on the surface and get out of place. A label bonded with an adhesive according to the invention will remain in place during the further manufacturing process. The use of the adhesive provides a label which is fixed in the wet state on the surface and no sliding of the label is observed. Additionally after drying the labels show a high adhesion to the substrates. If paper labels are used fiber tear occurs over most of the surface of the substrate.

The label bonded on the container can be removed from the substrate by immersing it to water, preferably an alkaline solution. This is typically done at elevated temperature for example from 40 to 95° C. or preferably more than 50° C. The solution or the container is agitated so that the disbonding is supported by mechanical stress. The adhesive is at least partially dissolved and removed from the surface of the substrate. Also at this recycling process step the use of the adhesive shows advantages as the swelling properties of the SAP component improve the dissolving of the adhesive layer.

EXAMPLES

Procedure:

A dispersion is prepared by mixing a poly(meth)acrylate dispersion with the additives, dispersing the SAP-powder in an excess of water and adding it under stirring and adjusting the pH with alkali to about 8. The solid content can be adjusted to a viscosity of about 100000 mPas (25° C.).

|  | Example 1 | Example 2 | Example 3 | comparison |
|---|---|---|---|---|
| Polyacrylic dispersion (50% solid) | 42 | 42 | 55 | 42 |
| Surfactant 1 | 0.5 |  | 0.5 | 0.5 |
| Surfactant 2 |  | 0.5 | 0.1 | ./. |
| Urea | 5 | 2 | 8 | 8 |
| SAP 1 | 2 | 4 |  | ./. |
| SAP 2 | 1 |  | 2 | ./. |
| Starch | 5 | 6.5 |  |  |
| Adhesion promoter | 0.1 | 0.2 |  | 0.1 |
| NaOH (20%) | 5.4 | 5.4 | 5.2 | 5.0 |
| Water (about) | 39 | 40 | 29 | 43 |
| Solid content (about)% | 34.0 | 33.5 | 38 | 34 |

Poly(meth)acrylic polymer Axilat 1688 (50% solid content)
Surfactant 1 Defoamer L 808
Surfactant 2 Surfynol 104
adhesion promoter native mais starch
Adhesion promoter Silan DAMO
SAP 1 Luquasorb 1003 (crosslinked Polyacrylate)
SAP 2 Polyox (polyethylenglycol $M_N$ 5000000)

Test:

Glass bottles are stored at 4° C. for 24 hours and filled with water (4° C.).

The cold bottles are placed in an climate chamber, 23° C., 50% rel. humidity, 1 hour, the water condenses on the surface. The adhesive is applied to the back side of a paper label (100×50 mm) at 25 g/m². Immediately the label is applied to a glass bottle covered with condensed water.

The bottle is placed again in the test chamber and remains for 3 hours.

The label does not slide on the surface downwards.

In case of the comparative adhesive the label slides down the bottle.

The bottle is allowed to dry for 24 hours. Then it is tried to tear of the label from the surface.

In case of the inventive adhesive composition more than 90% fiber break can be observed.

In case of the comparative adhesive loss of adhesion between glass and adhesive film. Less than 10% fiber break can be seen.

The invention claimed is:

1. Waterborne adhesive comprising
   1 to 50 weight-% of a (meth)acrylate copolymer the copolymer having an acid number from 0 to 150 mgKOH/g,
   2 to 30 wt-% of natural polymers, selected from the group consisting of starch, dextrin, cellulose, and proteins,
   0.5 to 30 wt-% of urea,
   0.1 to 20 wt-% of additives,
   characterized in that the adhesive contains 0.05 to 20 weight-% of a water swellable polymer.

2. The waterborne adhesive according to claim 1, characterized in that the (meth)acrylate copolymer is formed by copolymerization of at least one monomer of hydrophobic type with at least one monomer of hydrophilic type, and optionally monomers having carboxylic or sulfonic acid (ionic) groups.

3. The waterborne adhesive according to claim 1, in which the copolymer is formed by 40-80% hydrophobic monomers, 10-50% hydrophilic monomers, and 2-20% acid group containing monomers to constitute 100%, and has an acid number from 20 to 150 mg KOH/g.

4. The waterborne adhesive according to claim 2, in which the copolymer has a glass transition temperature of less than 0° C.

5. The waterborne adhesive according to claim 1, in which the natural polymer is an hydroxypropyl starch, an hydroxyethyl starch, or a carboxymethyl starch.

6. The waterborne adhesive according to claim 1, in which water swellable polymer is selected from the group consisting of polyacrylic acids, copolymers of polyacrylic acid with other comonomers, grafted starch polymers, polyacrylamides, polyacrylonitriles, and polyethyleneglycols and salts.

7. The waterborne adhesive according to claim 6, in which the water swellable polymer is present in an amount of 0.05 to 20 wt % of the total composition.

8. The waterborne adhesive according to claim 1, further comprising a silane having hydrolysable groups and one amine group.

9. The waterborne adhesive according to claim 1, adjusted to a pH from 6.5 to 9.5.

* * * * *